(12) United States Patent
Menor

(10) Patent No.: US 9,217,527 B2
(45) Date of Patent: Dec. 22, 2015

(54) NO-SKIVE HYDRAULIC HOSE COUPLING WITH IMPROVED HOSE RETENTION AND SEALING

(75) Inventor: Eric D. Menor, Marinette, WI (US)

(73) Assignee: Caterpillar Inc., Peoria, IL (US)

( * ) Notice: Subject to any disclaimer, the term of this patent is extended or adjusted under 35 U.S.C. 154(b) by 601 days.

(21) Appl. No.: 13/170,385

(22) Filed: Jun. 28, 2011

(65) Prior Publication Data

US 2012/0007356 A1  Jan. 12, 2012

Related U.S. Application Data

(60) Provisional application No. 61/361,672, filed on Jul. 6, 2010.

(51) Int. Cl.
```
F16L 33/00      (2006.01)
F16L 33/207     (2006.01)
F16L 33/01      (2006.01)
```

(52) U.S. Cl.
CPC .............. *F16L 33/2076* (2013.01); *F16L 33/01* (2013.01); *Y10T 29/49908* (2015.01)

(58) Field of Classification Search
CPC ............................... F16L 33/2076; F16L 33/01
USPC .......... 285/242, 256, 259, 222.1, 222.2, 222.4
See application file for complete search history.

(56) References Cited

U.S. PATENT DOCUMENTS

| | | | |
|---|---|---|---|
| 2,485,976 A * | 10/1949 | Main ............................ | 285/106 |
| 2,661,225 A * | 12/1953 | Lyon .......................... | 285/222.4 |
| 3,165,338 A * | 1/1965 | Moss ............................ | 285/256 |
| 3,224,794 A * | 12/1965 | Crissy .......................... | 285/40 |
| 3,539,207 A | 11/1970 | Harris | |
| 4,106,526 A | 8/1978 | Szentmihaly | |
| 4,366,841 A | 1/1983 | Currie et al. | |
| 4,367,889 A | 1/1983 | Redl | |
| 4,564,223 A * | 1/1986 | Burrington .................. | 285/256 |
| 4,569,541 A | 2/1986 | Eisenzimmer | |
| 4,653,779 A * | 3/1987 | Foster .......................... | 285/256 |
| 5,607,191 A | 3/1997 | Wilson | |

(Continued)

FOREIGN PATENT DOCUMENTS

| | | |
|---|---|---|
| FR | 2157455 | 6/1973 |
| GB | 2038968 | 7/1980 |

(Continued)

OTHER PUBLICATIONS

International Search Report for PCT/US2011/043030 dated Oct. 20, 2011.

*Primary Examiner* — David E Bochna
*Assistant Examiner* — James Linford
(74) *Attorney, Agent, or Firm* — Miller, Matthias & Hull LLP

(57) ABSTRACT

A hydraulic hose coupling, and method of assembling such to a hydraulic hose in a no-skive fashion. This is accomplished in many ways, some of which include the provision of a plurality of hose retention and sealing zones within the coupling, each of which include various combinations of radially inwardly directed barbs and radially inwardly and outwardly directed surface features on the inner stem of the coupling. With specific regard to the zone primarily directed to sealing, it includes a radially inwardly directed barb which works in conjunction with a straight cylindrical surface flanked by first and second radially inwardly directed recesses.

14 Claims, 4 Drawing Sheets

(56) References Cited

U.S. PATENT DOCUMENTS

| | | |
|---|---|---|
| 6,447,017 B1 * | 9/2002 | Gilbreath et al. ............... 285/89 |
| 7,338,090 B2 | 3/2008 | Baldwin et al. |
| 7,624,504 B2 | 12/2009 | Watanabe |
| 7,694,695 B2 | 4/2010 | Johnson et al. |
| 2004/0041394 A1 | 3/2004 | Dahms et al. |
| 2004/0251683 A1 | 12/2004 | Fisher et al. |
| 2010/0117355 A1 * | 5/2010 | Lamontia ................... 285/222.2 |
| 2010/0123309 A1 * | 5/2010 | Miller et al. .................. 285/256 |

FOREIGN PATENT DOCUMENTS

| | | |
|---|---|---|
| GB | 2046388 | 11/1980 |
| WO | 2010053815 | 5/2010 |

* cited by examiner

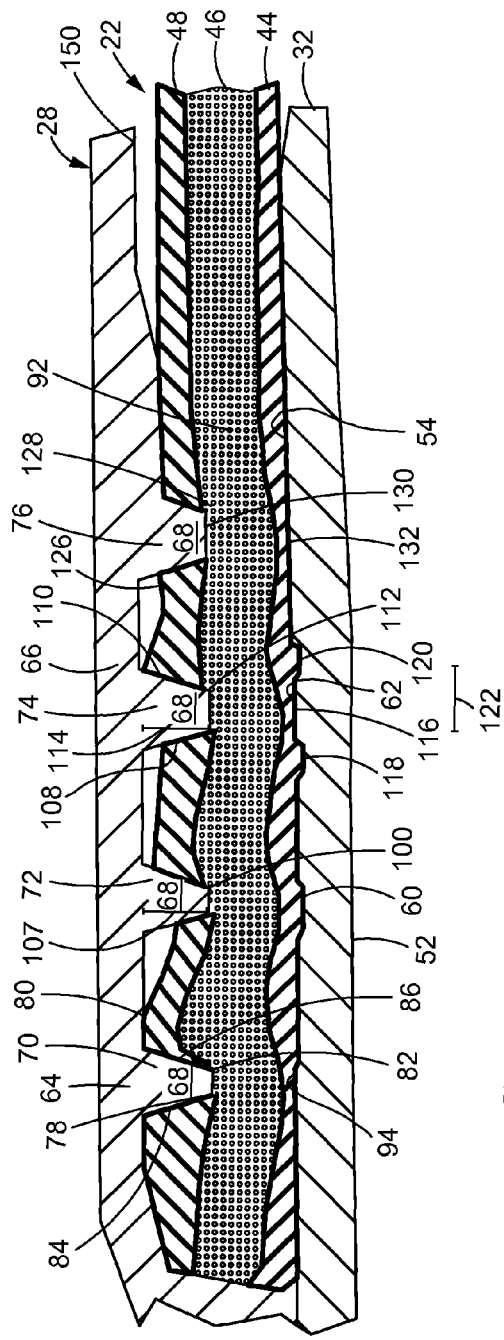
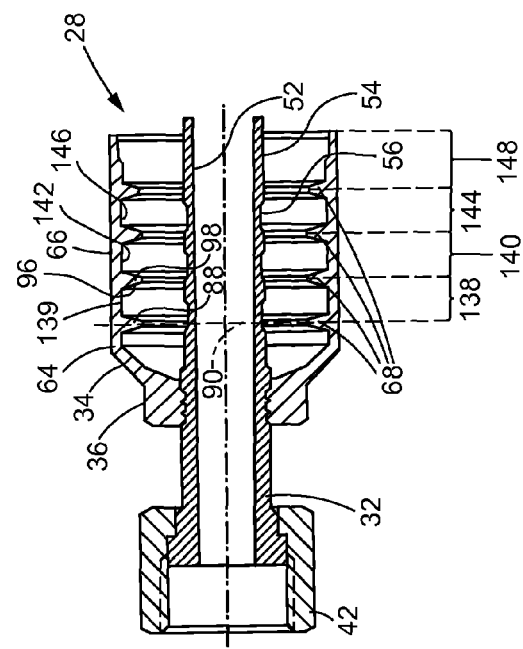

NO-SKIVE HYDRAULIC HOSE COUPLING WITH IMPROVED HOSE RETENTION AND SEALING

CROSS-REFERENCE TO RELATED APPLICATIONS

This is a non-provisional patent application claiming priority under 35 USC §119(e) to U.S. Provisional Patent Application No. 61/361,672 filed on Jul. 6, 2010.

TECHNICAL FIELD

The present disclosure generally relates to hydraulic hoses and, more particularly, relates to couplings for hydraulic hoses.

BACKGROUND

Many earth moving vehicles use pressurized hydraulic fluid as a mechanism for performing work. For example, with a motor grader, an earth-engaging blade downwardly depending from a main frame may be lifted, rotated and tilted using hydraulic cylinders; while with an excavator, a boom arm may be articulated with first and second hinged arms and a bucket at the terminus thereof, each being associated with a hydraulic cylinder to effect movement. Another example is a loader, wherein a lift arm hinged to the loader has a rotatable bucket or other implement hinged to an end of the lift arm. A lift cylinder may be associated with the lift arm and a tilt cylinder may be associated with the bucket or implement. When it is desired to lift the arm, the hydraulic fluid is directed to the lift cylinder, and when it is desired to rotate the bucket or implement, hydraulic fluid may be directed to the tilt cylinder.

In order to control cylinders on each of the afore-mentioned vehicles and other hydraulically powered machines, hydraulic hoses are connected between the hydraulic pumps and the cylinders. The pumps are driven by the engine, typically diesel engine, of the earth moving vehicle. The hoses are typically reinforced hoses in that they have an inner elastomeric liner, a reinforcing layer surrounding the inner elastomeric layer, and an outer elastomeric cover surrounding the reinforcing layer. The elastomeric liner is flexible to enable motion between the cylinders and the pump and various moving parts on the earth moving vehicle. The liner is reinforced, typically with metallic wires or braids so as to be able to contain the significant pressures exerted by the hydraulic fluid being traversed therethrough. In addition, the elastomeric cover is provided around the reinforcing layer to protect the hose from ambient conditions, abrasions, and the environment.

Such hydraulic hoses terminate in couplings enabling the hose to be connected to the hydraulic pump, the hydraulic cylinder, or other elements needing hydraulic pressure provided on the earth moving vehicle. Typically, such couplings include an inner stem which is inserted into the inner diameter of the hydraulic hose, and a ferrule or outer shell extending from the stem and spaced concentrically from the stem to provide a hose receiving space therebetween. The ferrule is then crimped towards the stem to compress the hydraulic hose towards the stem and frictionally hold it in place. The distal end of the stem can terminate in any number of different configurations including a hexagonal threaded nut, a flared coupling, an angled coupling, a male coupling, a female coupling, or the like.

The aforementioned types of couplings are referred to as no-skive couplings in that the external layer of elastomeric material need not be removed prior to the attachment of the coupling. Rather the ferrule is in direct engagement with the outer elastomeric cover and through the use of sufficient teeth or serrations, a mechanical grip penetrates the elastomeric cover and engages the underlying reinforcing metallic layer. Alternatively, certain hydraulic hose couplings do in fact need to be skived, or in other words shaved, so as to remove the external elastomeric cover and expose the metallic reinforcing cover underneath. Only after the elastomeric cover is removed can such couplings then be mechanically coupled to the metallic layer. As such couplings require significant manual input, no-skive couplings have become the predominate player in the field of hydraulic hose couplings.

While effective, users and manufacturers of such equipment are continually seeking improvements. Two areas which are currently less than optimum are the retention strength of the couplings on the hydraulic hose, and the seal provided between the coupling and the hose. As can be imagined, such hoses and the terminating couplings are often subjected to severe operating environments, pulling forces, and rotational torques. The couplings need to be able to withstand such motions repeatedly and under severe conditions. Not only must the coupling remain attached to the hose to thereby continue to communicate hydraulic fluid, but it must do so with no leakage of the hydraulic fluid. Accordingly, the seal between the coupling and the underlying hydraulic hose must remain intact throughout its work cycle. Any leak can, at the very least, result in less than optimal performance of the earth moving vehicle, or more problematically, can result in failure of the machine entirely. This not only can result in lost productivity, but as the hydraulic fluid is under extreme pressures can present a safety concern as well.

SUMMARY OF THE DISCLOSURE

In accordance with one aspect of the disclosure, a hydraulic hose and coupling assembly is provided. The assembly may include a hydraulic hose and a coupling secured to the hydraulic hose. Hydraulic hose may include an inner elastomeric liner, a reinforcing layer comprised of a plurality of metallic wires surrounding the inner elastomeric liner, and an outer elastomeric cover surrounding the metallic reinforcing layer. An inner stem inserted into the hose and in engagement with the inner elastomeric liner, and an outer ferrule surrounding the outer elastomeric cover. The outer ferrule may include a plurality of radially inwardly extending barbs, the inner stem may include a plurality of radially inwardly directed recesses, and radially outwardly directed serrations, at least one of the barbs being aligned so as to be positioned toward the inner stem and being flanked by at least two of the recesses, and at least one of the barbs are being aligned so as to be positioned toward one of the serrations.

In another aspect of the disclosure that may be combined with any of these aspects, the plurality of barbs are provided in first, second, third and fourth circumferential rows radially inwardly extending from the ferrule, and wherein the row of barbs aligned so as to be flanked by at least two recesses is the third row o barbs, and the row of barbs that are aligned with one of the radially outwardly protruding serrations of the inner stem is the first row of barbs.

In another aspect of the disclosure that may be combined with any of these aspects, the third row of barbs includes tips having widths equal to about the width of two of the metallic wires, and heights equal to about the thickness of the hose cover plus one of the metallic wires.

In another aspect of the disclosure that may be combined with any of these aspects, each of the recesses flanking the third row of barbs has a depth equal to about half the thickness of the liner.

In another aspect of the disclosure that may be combined with any of these aspects, the distance between the third and fourth rows of barbs is about the width of eight of the metallic wires, the distance between the second and third row of barbs is equal to about the width of ten of the metallic wires, and the distance between the first and second rows of barbs is equal to about the width of ten of the metallic wires.

In another aspect of the disclosure that may be combine with any of these aspects, the second row of barbs includes tips having widths equal to about the width of one of the metallic wires, and heights equal to about the thickness of the hose cover plus one and a half of the metallic wires.

In another aspect of the disclosure that may be combined with any of these aspects, the second row of barbs is aligned with one of the radially inwardly extending recesses in the inner stem, and the recess aligned with the second row of barbs has a depth equal to about twenty percent of the liner thickness and a width equal to about three times the second row barb thickness.

In another aspect of the disclosure that may be combined with any of these aspects, the first row of barbs includes tips having widths equal to about the width of one of the metallic wires, and heights equal to about the thickness of the hose cover plus two of the metallic wires.

In another aspect of the disclosure that may be combined with any of these aspects, the serration aligned with the first row of barbs has a width equal to about three of the metallic wires.

In another aspect of the disclosure that may be combined with any of these aspects, the fourth row of barbs includes tips having widths equal to about the width of three of the metallic wires, and heights equal to about the thickness of the hose cover plus one half of a metallic wire.

In accordance with another aspect of the disclosure, a hose coupling is provided which may include an inner stem, an outer ferrule extending from the inner stem and being substantially concentric with the inner stem, a plurality of barbs radially inwardly extending from the outer ferrule toward the inner stem, a plurality of radially inwardly extending recesses in the inner stem, at least two of the radially inwardly extending recesses flanking at least one of the radially inwardly extending barbs, and a plurality of radially outwardly extending serrations in the inner stem, at least one of the radially outwardly extending serrations being aligned with at least one of the radially inwardly extending barbs In another aspect of the disclosure that may be combined with any of these aspects, the plurality of radially outwardly extending barbs include a first, second, third, and fourth row of barbs, wherein the first row of barbs are aligned with one of the radially outwardly extending serrations in the inner stem, and wherein the third row of barbs are aligned so as to be flanked by first and second radially outwardly extending recesses within the inner stem.

In another aspect of the disclosure that may be combined with any of these aspects, the plurality of radially inwardly extending barbs include canted sides each having an angle relative to a longitudinal axis of the barbs of no more than fifteen degrees.

In accordance with another aspect of the disclosure, a hydraulic hose and hose coupling assembly is provided with may comprise a hydraulic hose having a liner, a reinforcing layer on a cover, and a coupling secured to the hose. The coupling may have an inner stem and an outer ferrule, the stem may have a substantially cylindrical outer surface interrupted by a plurality of serrations and recesses, the outer ferrule having a plurality of barbs, at least one barb being aligned with one of the serrations, at least one of the barbs being aligned with at least one of the recesses, at least one of the barbs being aligned with a substantially cylindrical outer surface, and at least one of the barbs being aligned with the substantially cylindrical outer surface and being flanked by two of the recesses.

In another aspect of the disclosure that may be combined with any of these aspects, the consecutive rows of circumferentially arrayed barbs are provided in first, second, third, and fourth rows, heights of the barbs decreasing from the first row to the fourth row, and the barbs have a tip width that increases from the second row to the fourth row.

In another aspect of the disclosure that may be combined with any of these aspects, a first zone may extend between the first row and the second row, a second zone may extend between the second row and the third row, a third zone may extend between the third row and the fourth row, and a fourth zone may extend after the fourth row, wherein the width of the zones decreases from the second zone to the third zone, the wire deflection decreases from the first zone to the fourth zone, and the amount of liner compression increases from the first row to the third row and decreases from the third row to the fourth row.

In accordance with yet another aspect of the disclosure, a method of assembling a coupling to a hydraulic hose is provided which may comprise inserting a coupling into a hydraulic hose wherein the hydraulic hose has an inner elastomeric liner, a reinforcing layer surrounding the elastomeric liner, and an elastomeric cover surrounding the reinforcing layer. The coupling may have an inner stem and a surrounding ferrule with hose retention and sealing space therebetween. The method further includes crimping the ferrule toward the stem wherein a plurality of barbs extend from the ferrule and penetrate the cover to engage the reinforcing layer, a plurality of recesses and serrations extending from the inner stem to receive and penetrate the liner, respectively, and the plurality of barbs, recesses, and serrations form a plurality of hose retention and sealing zones. The method may further include relieving strain in the liner within the hose retention and sealing zone having the highest level of liner compression while aligning the barbs within the zone having the highest level of liner compression with a cylindrical surface of the inner stem and flanking the cylindrical surface with first and second recesses.

In another aspect of the disclosure that may be combined with any of these aspects, the method may further include providing the plurality of barbs in first, second, third and fourth rows of circumferentially arrayed barbs, the first row of barbs compressing the reinforcing layer against a first serration such that the reinforcing layer has a thickness less than the thickness of the reinforced layer prior to assembly, and the method may further include providing the reinforcing layer with a plurality of metallic wires, and the crimping may cause the wires to deflect the most within a first hose retention and sealing zone between the first and second rows of barbs, second most within a second zone between the second row and the third row of barbs, third most within a third zone between the third row and fourth row of barbs, and least within a fourth zone after the fourth row of barbs.

In another aspect of the disclosure that may be combined with any of these aspects, the method may further include positioning the barbs, recesses, and serrations such that the liner compresses the most in the third zone, second most in the fourth zone, third most in the second zone, and the least in the first zone.

In accordance with another aspect of the disclosure, a hydraulic hose and coupling assembly is provided which may include a hydraulic hose having a liner, reinforcing layers surrounding the liner, and a cover surrounding the reinforcing layer, and a coupling secured to the hydraulic hose and having a proximal end adjacent to an opening in the hydraulic hose and a distal end further removed from the hydraulic hose opening then the proximal end. The coupling may include an inner stem and a surrounding ferrule defining hose retention and sealing space into which the hydraulic hose is maintained and sealed. The inner stem and surrounding ferrule may have surface features defining a plurality of hose retention and sealing zones, the plurality of hose retention and sealing zones each having a Menor Factor. The Menor Factor in each zone decreasing from the proximal end to the distal end.

These and other aspects and features of the disclosure will be more readily understood upon reading the following detailed description when taken in conjunction with the accompanying drawings.

BRIEF DESCRIPTION OF THE DRAWINGS

FIG. 3 is a portion of a cross-sectional view of the hose and coupling assembly of FIG. 1 taken along line 3-3 of FIG. 1;

FIG. 4 is a cross-sectional view of the hose coupling without the hose attached;

DETAILED DESCRIPTION

Figure 1:
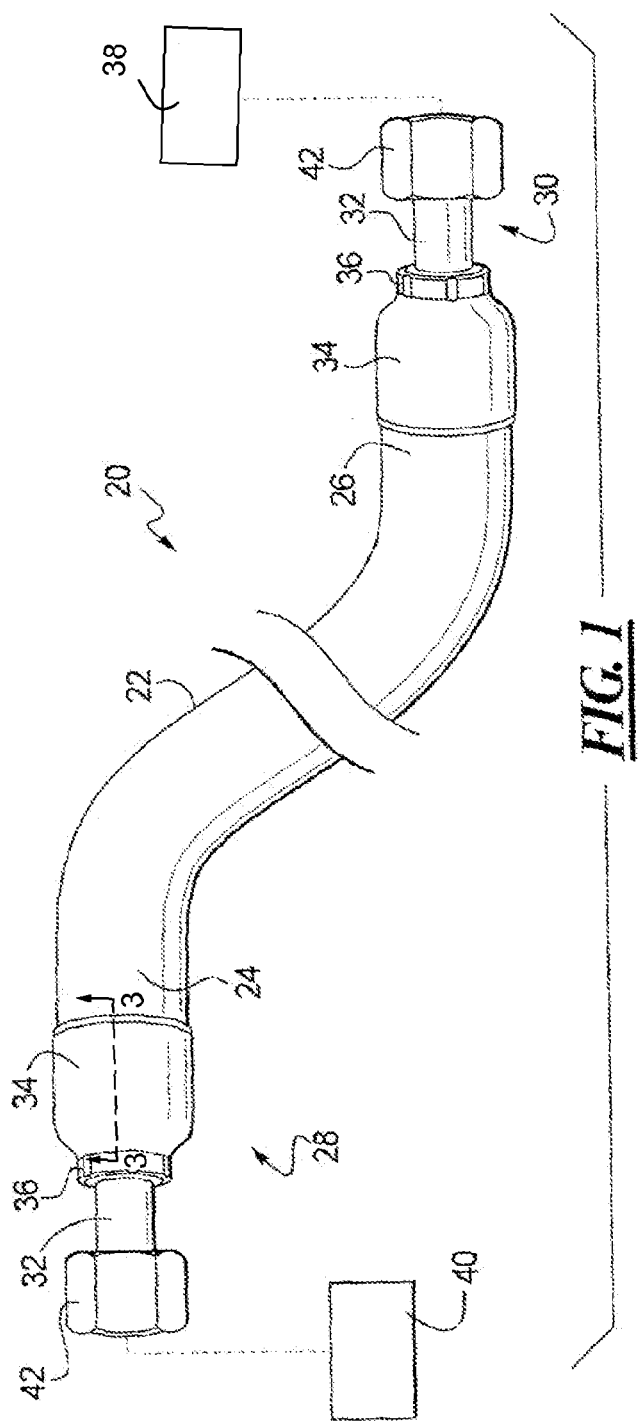
FIG. 1 is a perspective view of a hydraulic hose and coupling assembly constructed in accordance with the teachings of the disclosure.

Referring now to the drawings, and with specific reference to FIG. 1, a hydraulic hose and coupling assembly constructed in accordance with the teachings of this disclosure is generally referred to by reference numeral 20. It is to be understood that the hose and coupling assembly 20 depicted is but one example and that the teachings of the present disclosure are equally applicable to hoses and couplings of different shapes and configurations as well.

The hose and coupling assembly 20 includes a length of hydraulic hose 22 having distal and proximal ends 24 and 26. To the distal end 24 is attached a first coupling 28 and to the proximal end 26 a second coupling 30 is attached. As shown, each coupling 28 and 30 may include an inner stem 32 from which extends an outer shell or ferrule 34. At the juncture between the ferrule and the stem, a hexagonal or otherwise suitable wrenching surface 36 can be provided to facilitate attachment of the hose 22 to a pump 38, cylinder 40, or other element of an earth moving vehicle (not shown) needing hydraulic power. The coupling may further include a rotatable nut 42 for threaded attachment to the pump, cylinder or the like. Moreover, as indicated above, the coupling need not include the nut 42 as shown, but rather could be provided in the form of a flared coupling, a female coupling, or an angled coupling among others.

Figure 2:
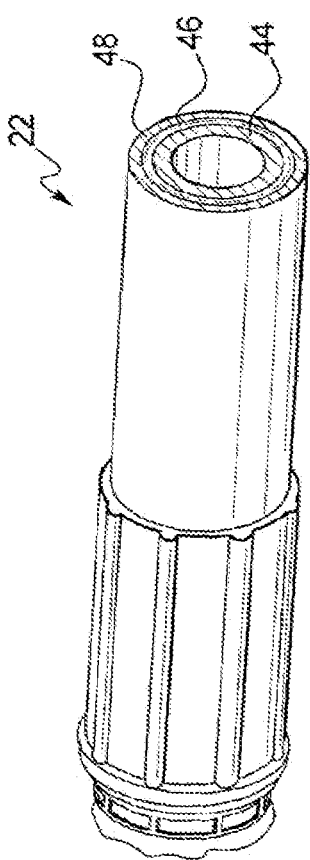
FIG. 2 is a cutaway view of the hose of FIG. 1.

Referring now to FIG. 2, a detailed cut-away view of an exemplary hose 22 is shown in more detail. As shown, the hose 22 may include an inner liner 44, surrounded by a reinforcing layer 46, which in turn is surrounded by an elastomeric outer cover 48. The elastomeric inner liner 44 provides a fluid tight conduit for communicating hydraulic fluid through the opening defined by inner diameter 50. The liner 44 may be manufactured from flexible elastomeric materials to enable the hydraulic fluid to be communicated while the earth moving vehicle is moved, the cylinder is moved, and/or the other moving parts of the vehicle are differently positioned. The reinforcing layer 46 may be provided in the form of a plurality of metallic wires or braids surrounding the inner elastomeric liner 44. The reinforcing layer 46 is used to provide sufficient radial strength to the hose so as to contain the hydraulic fluid being communicated therethrough. For example, such hydraulic fluids are often times communicated in excess of thousands of PSI which the elastomeric liner by itself would not be able to contain. Moreover, governmental regulations dictate that such hose be built to withstand significantly greater pressure than the actual working pressure of the hydraulic fluid, and thus the reinforcing layer allows that requirement to be met. For example, such hose is typically required to have a burst pressure (i.e. the minimum pressure at which the tube will burst apart), which is at least four times greater than the average working pressure of the hydraulic fluid. Finally, the outer elastomeric cover 48 is also manufactured from a flexible material such as a rubber or polymeric material similar to that from which the inner liner 44 is manufactured. The cover 48 allows the hose 22 to maintain its flexibility while also protecting the reinforcing layer 46 and inner liner 44 from the ambient conditions, abrasion, and other environmental conditions.

Referring now to FIGS. 3 and 4, the interaction between the hose 22 and coupling 28 is shown in greater detail. As mentioned above, the present disclosure is directed to a no-skive coupling in that the outer cover 48 remains intact when the coupling 28 is attached to the hose 22. In accordance with the present disclosure, it is able to do so based on the structure set forth in FIGS. 3 and 4.

Starting with FIG. 4, it shows the inner stem 32 and outer ferrule 34 in cross-sectional detail. The inner stem 32 includes a cylindrical inner diameter 52 and an outer diameter 54 with a plurality surface features 56 designed to facilitate the retention and sealing of the hose 22 relative to the coupling 28. Those surface features 56 may include a plurality of radially outwardly extending serrations 58, a plurality of radially inwardly extending recesses 60 and a plurality of straight cylindrical surfaces 62.

With respect to the outer ferrule 34, it includes an outer cylindrical wall 64 substantially concentric with the inner stem 32. The outer surface 66 of the wall 64 may be substantially cylindrical but radially inwardly extending from the outer wall 64 are provided a plurality of barbs 68. In the depicted embodiment, first, second, third, and fourth rows of barbs 70-76 are provided with specific dimensions and spacing both relative to each other and relative to the surface features 56 to enhance the hose retention and sealing features identified above.

Starting with the first barb 70, while not easily discernable from the sectional views of FIGS. 3 and 4, it is to be understood that the barb 70 is in fact circumferential in that it extends around the entire inner diameter of the outer wall 64. In cross-section, it can be seen to include a barb height 78 extending from the inner surface 80 of the cylindrical wall 64 to the outer tip 82 of the barb 70. First and second canted side walls 84 and 86 extend from the inner surface 80 to the outer tip 82 at an angle 88 selected so as to enable the barb 70 to easily penetrate the outer cover 48 when the coupling 28 is attached to the hose 22. The angle 88 may be provided at fifteen degrees relative to a longitudinal axis 90 of the barb 70 or other embodiments could be provided within plus or minus five degrees of such angle. With respect to the outer tip 82, it is also of a specific dimension relative to the size of the wires 92 forming the reinforcing layer 46. More specifically, the outer tip 82 of the first barb 70 may be provided with a width equal to approximately one of the reinforcing wires 92. By providing such a slim profile, the tip 82 is able to easily penetrate not only the outer cover 48 but the reinforcing layers 46 as will be described in further detail herein.

Opposite the first barb 70 is a serration 94 which, as indicated above, is a surface radially extending away from the outer diameter 54 of the stem 32. The serration 94 is not only provided directly across and in alignment with the first barb 70 but is provided with a specific size and shape as well. More specifically, the serration 94 may be provided with a width of approximately three of the reinforcing wires 92.

Moving on to the second barb 72, it is of a similar profile to the first barb 70 in the sense that it is circumferential and provided with first and second canted walls 96 and 98. Moreover, it includes an outer tip 100 again having a width of approximately that of one of the reinforcing wires 92. Opposite to the second barb 72 is a recess 102 which radially inwardly extends from the outer diameter 54 of the inner stem 32. The recess 102 may be about three times the width of the outer tip 100 and includes a depth 106 equal to approximately twenty percent of the thickness of the liner 44. The second barb 72 has a height 107 less than the first barb 70.

With respect to the third barb 74, it again includes canted walls 108 and 110 and an outer tip 112, but the outer tip 112 is approximately twice as wide as the tips of the first and second barbs 70 and 72. More specifically, the outer tip 112 may be approximately the width of two of the reinforcing wires 92. The third barb 74 may include a barb height 114 less than the second barb 72 and roughly equal to the thickness of the cover 48 plus one of the reinforcing wires 92. Aligned with, and opposed to, the outer tip 112 is a straight cylindrical surface 116 which in turn is flanked by first and second recesses 118 and 120. The straight cylindrical surface 116 has a width 122 approximately equal to four of the reinforcing wires 92, while the recesses 118 and 120 include a depth equal to approximately half the thickness of the liner 44.

Finally, with respect to the fourth barb 76, it also includes first and second canted walls 126 and 128 which terminate in an outer tip 130. The outer tip 130 may include a width equal to approximately two of the reinforcing wires 92. Opposite to, and aligned with, the outer tip 130 is a second straight cylindrical surface 132 which extends from the second flanking recess 120 to the distal end 134 of the coupling 28.

In providing the barbs 68 and surface features 56 in aligned pairs, it will be noted that the hose and coupling assembly 20 provides a plurality of hose retention and sealing zones 136, each of which is designed to optimize the hose retention and sealing capabilities of the assembly as will be described in further detail herein. Starting with first zone 138, it is defined herein as extending from the alignment of the first barb 70 and the serration 94 to the beginning of the second barb 72. In fact, the first barb 70 and second barb 72 are specifically spaced apart to define the length of the first zone 138. That distance 139 is approximately the width of ten of the reinforcing wires 92.

A second zone 140 extends from the second barb 72 to the beginning of the third barb 74. The second zone length is defined by the distance 142 between the first and second barbs which may be provided again at a width of approximately ten of the reinforcing wires 92.

A third zone 144 extends from the third barb 74 to the fourth barb 76 with a distance 146 defining the zone 144 and being of a width approximately equal to eight of the reinforcing wires 92.

Finally, a fourth zone 148 extends from the fourth barb 76 to the distal end 134.

A significance of the hose retention and sealing zones 136 is that each zone is optimized so as to be primarily directed to hose retention, hose sealing, and transitions therebetween. In order to do so, the barbs and surface features cooperate so as to penetrate the cover to varying degrees, deflect the reinforcing wires to various degrees, and compress the liner to varying degrees as well. More specifically, the first zone 138 is primarily directed to retaining the hose 22 within the coupling 28. Accordingly, the barb 70 as indicated above is provided with a finely dimensioned tip 82 designed not only to easily penetrate the cover 48 but also more easily penetrate the reinforcing wires 92. In so doing, it can be seen from FIG. 3 that the wires 92 deflect more in the first zone 138 than in any of the other three zones. By so penetrating the metallic reinforcing wires 92 with the metallic barb 70, the retention of the coupling 28 on the hose 22 is greatly enhanced. Moreover, the surface feature 56 provided within the first zone 138 is in fact a serration 94 which extends from the straight cylindrical surface of the stem 32 so as to limit the space between the outer tip 82 and surface feature 56 when crimped. This in turn facilitates deformations of the wires 92 as shown. This also is not detrimental to the sealing capability of the assembly 20 in that latter zones are tasked with the primary function of sealing the coupling 28 to the hose 22.

Moving on to the second zone 140, it serves as a transition zone between the wire retention features of the first zone 138 and the sealing features of the third zone 144. In so doing, it serves as both a retention zone and a sealing zone. With respect to retention, the outer tip 100 is provided with the same fine width as the first zone 138 so as to enable easy penetration of the outer cover 48 and disturbance of the metallic wires 92. However, it will be noted that the second zone 140 includes a recess 102 as its surface feature 56 and thus while the width of the tip 100 would allow for the same ease of penetration into the wires 92 as the first zone 138, the added dimension between the tip 100 and the recess 102 causes the tip 100 not to penetrate the wires 92 to the same degree as the first zone 138, thereby providing greater deformation in the liner 44 to facilitate sealing. However, given the smaller dimension of the outer tip 100, some degree of wire deflection is noticeable in the second zone 140, although not of the same degree as the first zone 138.

With respect to the third zone 144, it serves as the main sealing zone of the assembly 20. Penetration of the wires 92 is not of as much significance as with the first and second zones, and thus it will be noted that its outer tip 112 is substantially wider than the tips of the first and second barbs 70 and 72. However, third zone 144 has significantly different surface features 56 provided in the adjacent and aligned section of the inner stem 32. More specifically, a recess is not provided directly adjacent or aligned with the outer tip 112, but rather a straight cylindrical surface 116 is, thereby providing a relatively small dimension between the two elements when the coupling 28 is crimped onto the hose 22. However, as this may result in significant strain within the liner 44, the straight cylindrical surface 116 is flanked by first and second recesses 118 and 120. In other words, when the third barb 74 compresses toward the straight cylindrical surface 116, this compresses the inner liner 44 to the highest level of any of the three zones thereby providing maximum sealing capability. However, in order to relieve the mechanical strain induced in the liner 44 and thereby elongate the serviceable life of the elastomeric liner (i.e. avoiding cracking or other physical deformation of the liner), the flanking recesses 118 and 120 provide additional space into which the material of the liner 44 can be moved to thereby absorb some of that compression and thereby relieve some of the strain within the liner 44 directly between the outer tip 112 and straight cylindrical surface 116.

Finally, with respect to the fourth zone 148, it also serves as a transition zone but one between the sealing function of the third zone 144 and the distal end 134 of the coupling 28. This area eases the hose from the slight wire deflection at the beginning of the fourth zone 148 and slight liner compression at the beginning of the fourth zone 148 to the uncrimped state at the end of the fourth zone 148 proximate the distal end 134. In so doing, the delta force to which the hose is subjected inside and outside the coupling is minimized. A final shell barb 150 is provided at the distal end 134.

Figure 5:
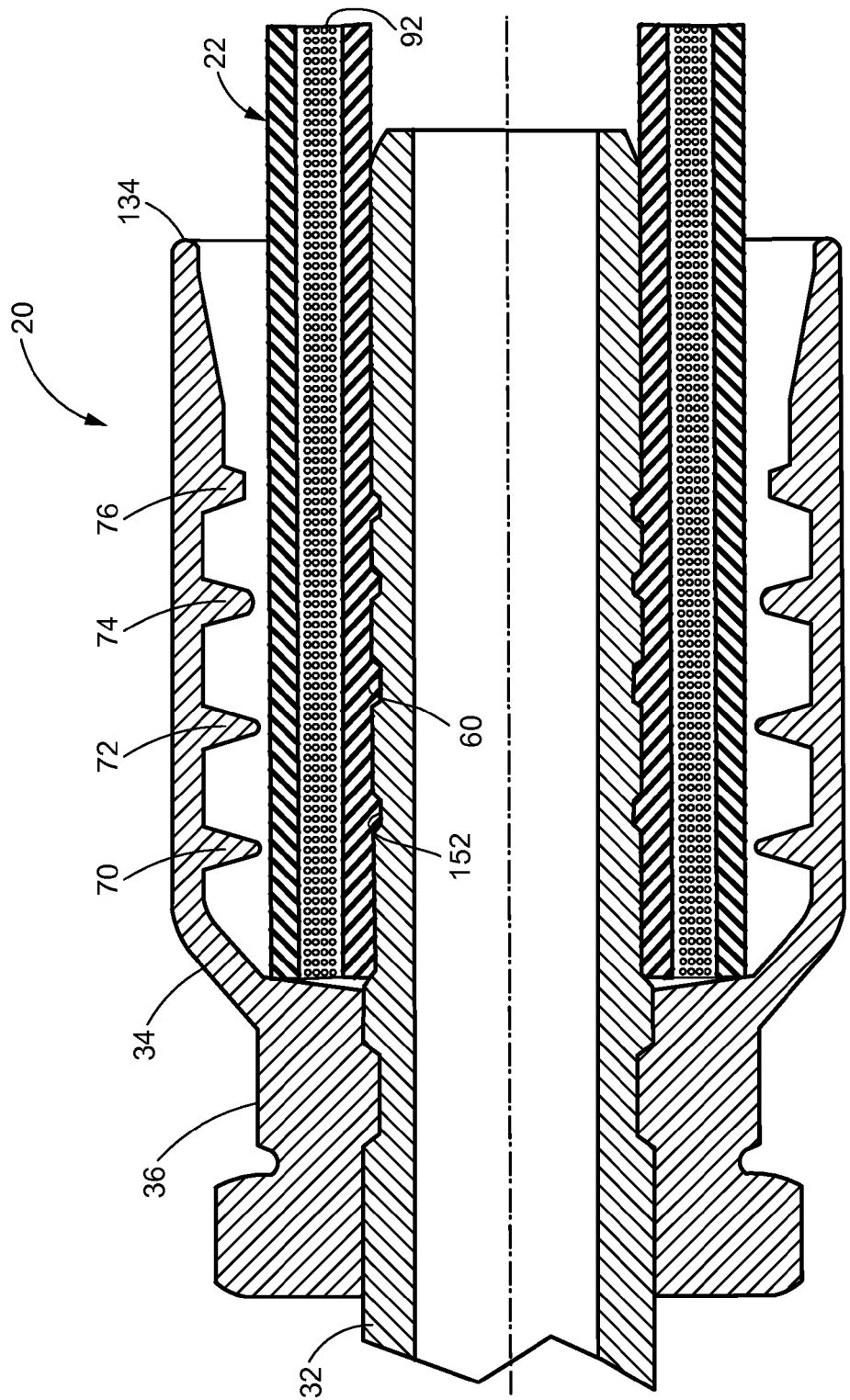
FIG. 5 is a cross-sectional view of an alternative embodiment of the hose coupling and hose prior to crimping.
Figure 6:
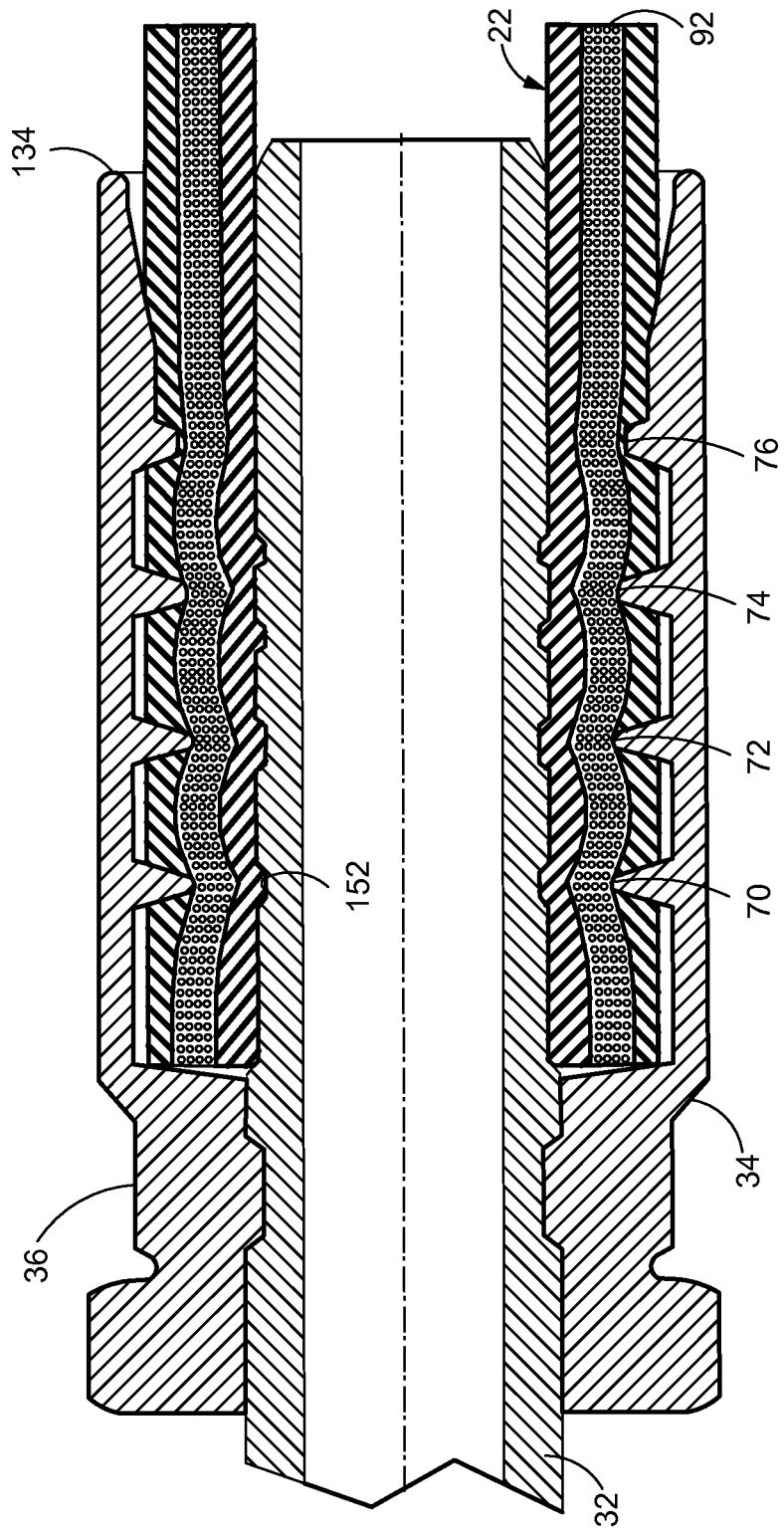
FIG. 6 is a cross-sectional view of the alternative embodiment of the hose coupling and hose of FIG. 5, but after crimping.

FIGS. 5 and 6 depict an alternative embodiment of the present disclosure. The alternative embodiment is identical to the first embodiment but for replacing the serration 58 with a recess 152, and removing the final shell barb 150 entirely. The recess 152 includes a depth equal to about three times the width of the outer tip 82 of first barb 70 adjacent thereto. The final shell barb 150 is removed to better transition liner compression through the fourth zone 148, and provide a slightly less tight crimping diameter.

Based on the foregoing, it can be seen that the hose and coupling assembly 20 provides a vastly improved structure and method for attaching a coupling to a hydraulic hose. The barbs and surface features are designed and oriented so as to maximize the hose retention and sealing features of the assembly, while still maintaining the required inner diameters and outer diameters dictated by the users of such couplings. Moreover, while the foregoing has been made with reference to specific dimensions, angles, and relative proportions of the pieces in terms of ratios, the inventors have created a specific factor which can be used to manufacture a coupling and hose and coupling assembly which provides for enhanced hose retention and sealing capability. That factor, known herein as the Menor Factor (abbreviated $F_M$), incorporates and takes into account many of the foregoing features identified above, including, the degree of wire deflection in the reinforcing wires 92 (abbreviated herein as $W_D$); the degree of compression of the inner liner 44 (herein abbreviated as $L_C$), the height of each of the barbs (hereinafter abbreviated $B_H$); the width of the barb tips (herein abbreviated as $T_W$); and the length of each of the zones (hereinafter abbreviated as $Z_L$)

Taking each parameter into account, the Menor Factor can be mathematically represented by the following equation:

$$F_M = W_D / L_C + (B_H)(T_W + \tfrac{1}{2} Z_L);$$

wherein $F_M$ equals the Menor Factor;
$W_D$ equals wire deflection;
$L_C$ equals liner compression;
$B_H$ equals barb height;
$T_W$ equals tip width; and
$Z_L$ equals zone length.

From the foregoing, it can be seen that the teachings of the present disclosure can be used to manufacture a hose coupling and hydraulic hose and coupling assembly with greatly improved hose retention and sealing capability relative to prior art designs.

Industrial Applicability

In general, the technology disclosed herein has industrial applicability in a variety of settings such as, but not limited to, earth moving vehicles employing hydraulic power and cylinders. In such applications, pressurized hydraulic fluid needs to be communicated from a pump or pumps to a cylinder or cylinders to perform useful work. Such hydraulic fluid is carried by a hydraulic hoses terminating in couplings for attachment to the pump, cylinder, or the like. In such applications, it is imperative that the coupling remains attached to the hose and sealed thereto. The present disclosure is able to do so through the unique incorporation of a variety of novel features, some of which are reiterated below.

In order to retain the coupling most advantageously onto the hose, the coupling is provided with a series of radially inwardly directed barbs of varying height and width. By varying the heights with the longest barb being provided closest to the proximal end of the coupling and the shortest barb being provided closest to the distal end of the coupling, it is ensured that the first row of barbs penetrates the outer cover of the hose to the greatest degree, and more importantly for purposes of retention, penetrates the reinforcing wires to the greatest degree thereby causing a greatest degree of wire deflection.

Moreover, to facilitate the deformation of the wires, the tips of the first and second row of barbs are provided with the smallest width dimension of the tips, and which then increases as the barbs approach the distal end of the coupling. This again facilitates penetration of the wires, and deflection of same.

Concomitantly with the width and height of the barbs, the inner stem is provided with a plurality of surface features to augment the performance of the barbs. More specifically, as it is a goal of the first and second zones to primarily be directed to retaining the coupling on the hose, and for the third and fourth row of barbs and zones to seal the hose relative to the coupling, the surface features provided on the inner stem are varied as well.

In order to ensure the greatest degree of wire deflection in the first zone, not only is the barb shaped as indicated above, but aligned with that first barb is a serration which radially outwardly extends from the first stem. This in turn reduces the overall dimension between the serration and the tip thereby limiting the room into which the wire and elastomeric material can be forced, in so doing, the wires are caused to radially outwardly deflect into the first zone thus enhancing the retention capability of the first zone. The same is somewhat true with respect to the second barb in that it is dimensioned with a tip of the same width, but as will be noted and was discussed above, opposite to the second barb, is provided a recess not a serration. This therefore forms an advantageous transition zone between the first zone and the third zone, wherein the second zone provides somewhat less retention capabilities but somewhat increase sealing capabilities. In so doing, it can be seen from the above figures that the wire deflects to a significant degree in second zone but not as much as in the first zone. Conversely, the liner compresses to a greater degree in the second zone relative to the first zone.

In order to provide the improved sealing capabilities of the present disclosure, the third zone provides a unique combination of barb geometry and inner stem surface features. More specifically, the barb is provided with a slightly wider tip dimension and shorter height dimension so as to not penetrate the outer cover to the same degree and not to penetrate the reinforcing wires. Accordingly, it will be noted that the wire deflection in the third zone is thus greatly diminished. However, the third barb works in conjunction with the surface features aligned therewith, namely a central straight cylindrical section flanked by first and second recesses. The flat cylindrical section provides a surface against which the widened third barb can compress to thereby compress the liner and provide the greatest degree of sealing capability in the third zone. However, by compressing the liner to such a degree to reach the desired sealing capabilities, significant mechanical strain is generated within the material of the liner itself which, but for the novel contributions of the present inventors, could result in cracking of the elastomeric material over time. However, the inventors have cleverly provided flanking recesses about that straight cylindrical surface so as to relieve the mechanical strain within the liner while at the same time allowing the compression of the liner to be maintained at a sufficiently high level to reach the sealing capability desired.

Finally, the fourth zone provides a transition between the sealing features of the third zone to the distal end of the coupling. As the distal end of the coupling will be the area of the hose and coupling assembly subjected to the greatest mechanical forces as the hose moves, is angled, reciprocates, and otherwise endures the motions required by the earth moving vehicle, the inventors have provided a relatively long fourth transition zone to, on the one hand, protect the sealing capabilities of the third zone, while on the other hand allow for the increased range of motion encountered by the fourth zone.

From the foregoing, it can be seen that the teachings of the present disclosure can be used on any hydraulic system employing hydraulic hoses and couplings including earth moving vehicles such as, but not limited to, loaders, excavators, track type tractors, rippers, pipe layers, trucks, scrappers, compactors, skid steers, harvesters, graders, lift trucks, and the like.

What is claimed is:

1. A hydraulic hose and coupling assembly, comprising:
a hydraulic hose having an inner elastomeric liner, a reinforcing layer comprised of a plurality of metallic wires surrounding the inner elastomeric liner, and an outer elastomeric cover surrounding the metallic reinforcing layer; and
a coupling secured to the hydraulic hose in a no-skive arrangement and having a proximal end adjacent to an opening of the hydraulic hose and a distal end further removed from the hydraulic hose opening than the proximal end, the coupling including:
an inner stem inserted into the hose and in engagement with the inner elastomeric liner, the inner stem having an inner diameter, a first end and a second end, the first end free of the hose and the second end disposed inside the hose, the inner stem including a plurality of radially inwardly directed recesses, a radially outwardly directed serration, and a plurality of straight cylindrical outer surfaces positioned within an outer ferrule, wherein each of the straight cylindrical outer surfaces that are positioned within the outer ferrule are oriented parallel to a longitudinal axis of the inner stem and are disposed before or after each of the recesses positioned within the outer ferrule; and
the outer ferrule surrounding the outer elastomeric cover, the outer ferrule including a plurality of radially inwardly extending barbs disposed in first, second, third and fourth circumferential rows, the fourth row of barbs disposed to extend toward and align with a first of the plurality of straight cylindrical outer surfaces of the inner stem, the third row of the barbs disposed to extend toward and align with a second of the plurality of straight cylindrical outer surfaces of the inner stem, the second straight cylindrical outer surface flanked by at least two of the recesses, wherein one of the rows of barbs is disposed to extend toward and align with the serration,
wherein the rows of barbs and the inner stem define a plurality of hose retention and sealing zones, the plurality of hose retention and sealing zones each having a Menor Factor, the Menor Factor in each zone decreasing from the proximal end toward the distal end,
wherein the Menor Factor is the mathematical equation $$F_M = W_D/L_C + (B_H)(T_W) + \tfrac{1}{2} Z_L$$

wherein $F_M$ equals the Menor Factor;
$W_D$ equals wire deflection;
$L_C$ equals liner compression;
$B_H$ equals barb height;
$T_W$ equals tip width; and
$Z_L$ equals zone length.

2. The hydraulic hose and coupling assembly of claim 1, wherein the row of barbs that is aligned with the serration of the inner stem is the first row of barbs.

3. The hydraulic hose and coupling assembly of claim 2, wherein the third row of barbs includes tips having widths equal to about the width of two of the metallic wires, and heights equal to about the thickness of the hose cover plus one of the metallic wires.

4. The hydraulic hose and coupling assembly of claim 2, wherein each of the recesses flanking the second straight cylindrical outer surface has a depth equal to about half the thickness of the liner.

5. The hydraulic hose and coupling assembly of claim 2, wherein the distance between the third and fourth rows of barbs is about the width of eight of the metallic wires, the distance between the second and third rows of barbs is equal to about the width of ten of the metallic wires, and the distance between the first and second rows of barbs is equal to about the width of ten of the metallic wires.

6. The hydraulic hose and coupling assembly of claim 2, wherein the second row of barbs include tips having widths equal to about the width of one of the metallic wires, and heights equal to about the thickness of the hose cover plus one and a half of the metallic wires.

7. The hydraulic hose and coupling assembly of claim 2, wherein the second row of barbs is aligned with one of the radially inwardly extending recesses in the inner stem, and wherein the recess aligned with the second row of barbs has a depth equal to about twenty percent of the liner thickness and a width equal to about three times the second row barb thickness.

8. The hydraulic hose and coupling assembly of claim 2, wherein the first row of barbs includes tips having widths equal to about the width of one of the metallic wires, and heights equal to about the thickness of the hose cover plus two of the metallic wires.

9. The hydraulic hose and coupling assembly of claim 2, wherein the serration aligned with the first row of barbs has a width equal to about three of the metallic wires.

10. The hydraulic hose and coupling assembly of claim 2, wherein the fourth row of barbs includes tips having widths equal to about the width of three of the metallic wires, and heights equal to about the thickness of the hose cover plus one half of a metallic wire.

11. A hydraulic hose and hose coupling assembly, comprising:
a hydraulic hose having a liner, reinforcement layer, and cover; and
a coupling secured to the hose in a no-skive arrangement and having a proximal end adjacent to an opening of the hydraulic hose and a distal end further removed from the hydraulic hose opening than the proximal end, the coupling including an inner stem and an outer ferrule, the stem defining an inner diameter and having a first end and a second end, the first end free of the hose and the second end disposed inside the hose, the stem including a plurality of radially inwardly directed recesses, a plurality of substantially cylindrical outer surfaces positioned within an outer ferrule, and a serration, the outer ferrule having a plurality of barbs disposed in first, second, third and fourth circumferential rows, at least one row of the barbs is disposed to extend toward and align with the serration, at least one row of the barbs is disposed to extend toward and align with at least one of the recesses, the fourth row of the barbs is disposed to extend toward and align with a first of the substantially cylindrical outer surfaces, and at least one row of the barbs is disposed to extend toward and align with a second of the substantially cylindrical outer surfaces and is disposed to be flanked by two of the recesses, wherein each of the substantially cylindrical outer surfaces that are positioned within the outer ferrule are oriented parallel to a longitudinal axis of the inner stem and are disposed before or after each of the recesses positioned within the outer ferrule, wherein the plurality of barbs and the inner stem define a plurality of hose retention and sealing zones, the plurality of hose retention and sealing zones each having a Menor Factor, the Menor Factor in each zone decreasing from the proximal end toward the distal End, wherein the Menor Factor is the mathematical equation $$F_M = W_D/L_C + (B_H)(T_W) + \frac{1}{2}Z_L$$

wherein $F_M$ equals the Menor Factor;
$W_D$ equals wire deflection;
$L_C$ equals liner compression;
$B_H$ equals barb height;
$T_W$ equals tip width; and
$Z_L$ equals zone length.

12. The hydraulic hose and hose coupling assembly of claim 11, wherein heights of the barbs decrease from the first row to the fourth row, and wherein the barbs each have a tip width and wherein the barb tip width increases from the second row to the fourth row.

13. The hydraulic hose and hose coupling assembly of claim 12, in which the plurality of hose retention and sealing zones further include a fourth zone after the fourth row of barbs, wherein an amount of wire deflection in each of the zones decreases from the first zone to the fourth zone, and wherein an amount of compression on the liner provided by engagement of the barbs on the hose increases from the first row to the third row and decreases from the third row to the fourth row.

14. A hydraulic hose and coupling assembly, comprising:
a hydraulic hose having a liner, a reinforcement layer surrounding the liner, and a cover surrounding the reinforcement layer; and
a coupling secured to the hydraulic hose in a no-skive arrangement and having a proximal end adjacent to an opening of the hydraulic hose and a distal end further removed from the hydraulic hose opening than the proximal end, the coupling including an inner stem and surrounding ferrule defining a hose retention and sealing space into which the hydraulic hose is retained and sealed, the inner stem and surrounding ferrule having surface features defining a plurality of hose retention and sealing zones, the plurality of hose retention and sealing zones each having a Menor Factor, the Menor Factor in each zone decreasing from the proximal end toward the distal end, wherein the Menor Factor is the mathematical equation $$F_M = W_D/L_C + (B_H)(T_W) + \frac{1}{2}Z_L$$

wherein $F_M$ equals the Menor Factor;
$W_D$ equals wire deflection;
$L_C$ equals liner compression;
$B_H$ equals barb height;
$T_W$ equals tip width; and
$Z_L$ equals zone length.

* * * * *